United States Patent
Cimo

[11] Patent Number: 5,564,722
[45] Date of Patent: Oct. 15, 1996

[54] WHEELBARROW

[76] Inventor: Richard T. Cimo, 11076 Highway 707, Murrells Inlet, S.C. 29576

[21] Appl. No.: 343,373

[22] Filed: Nov. 22, 1994

[51] Int. Cl.$^6$ ..................................................... B62B 1/22
[52] U.S. Cl. ............................... 280/47.3; 280/47.33
[58] Field of Search ........................ 280/47.3, 47.31, 280/47.17, 47.19, 47.24, 47.26, 47.27, 47.28, 47.29, 47.32, 47.33

[56] References Cited

U.S. PATENT DOCUMENTS 3,279,810  10/1966  Ashworth ..................... 280/47.3
3,488,091  1/1970   Baker ........................... 280/47.31
4,190,260  2/1980   Pearce .......................... 280/47.33

Primary Examiner—Richard M. Camby
Attorney, Agent, or Firm—Michael I. Kroll

[57] ABSTRACT

An improved wheelbarrow is provided which consists of a framework. A wheel assembly is near a front lower end of the framework. A handle array extends from a rear end of the framework. A flat bed is on the handle array over the framework and the wheel assembly. A structure on the flat bed is for engaging with and lifting a band of bricks onto the flat bed, so that the band of bricks can be hauled as one unit from an unloading site to a building site.

5 Claims, 2 Drawing Sheets

U.S. Patent
Oct. 15, 1996
Sheet 1 of 2
5,564,722
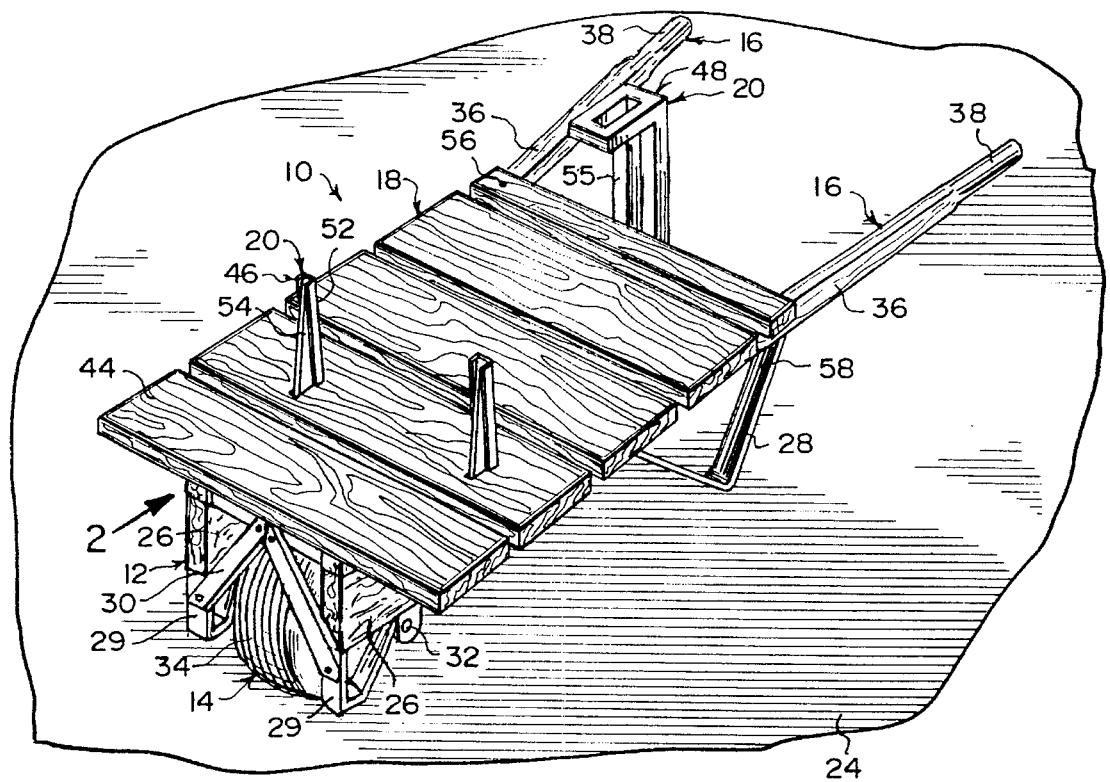
Fig.1
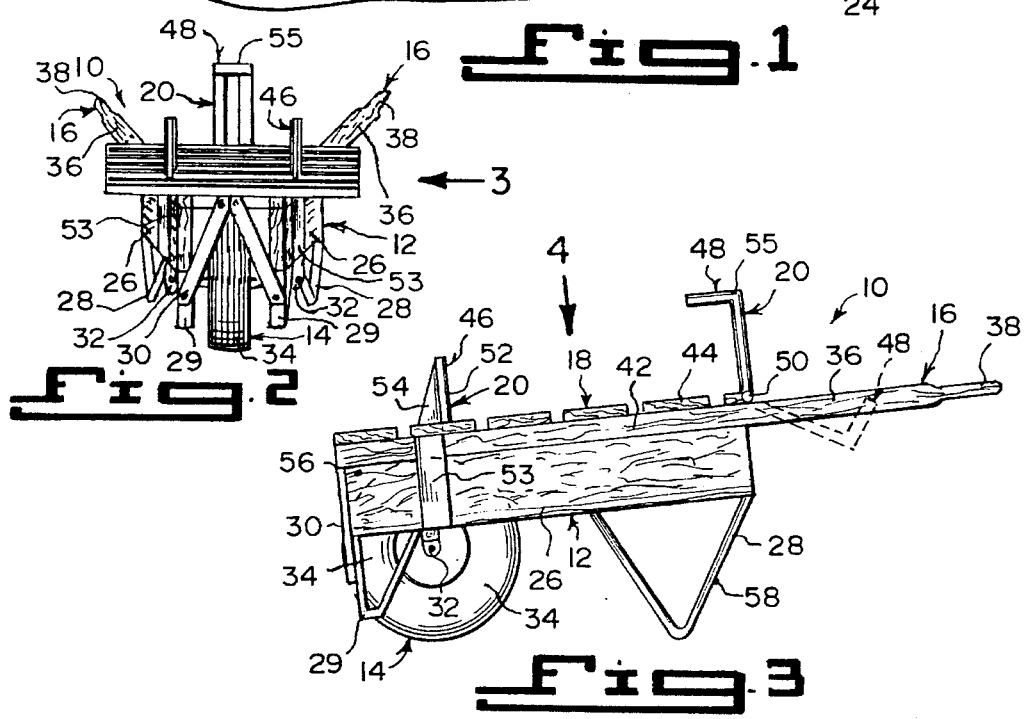
Fig.2
Fig.3

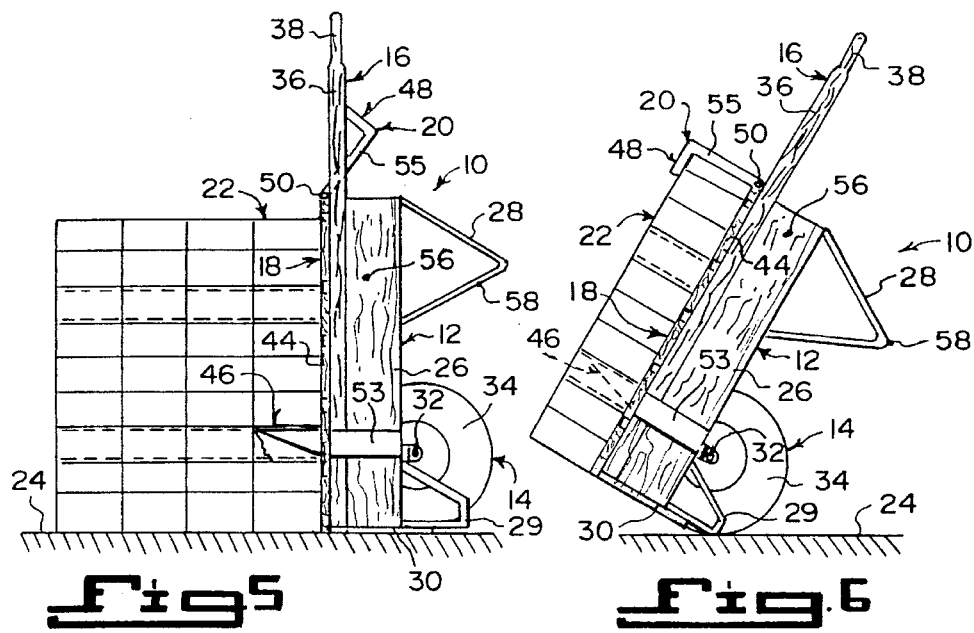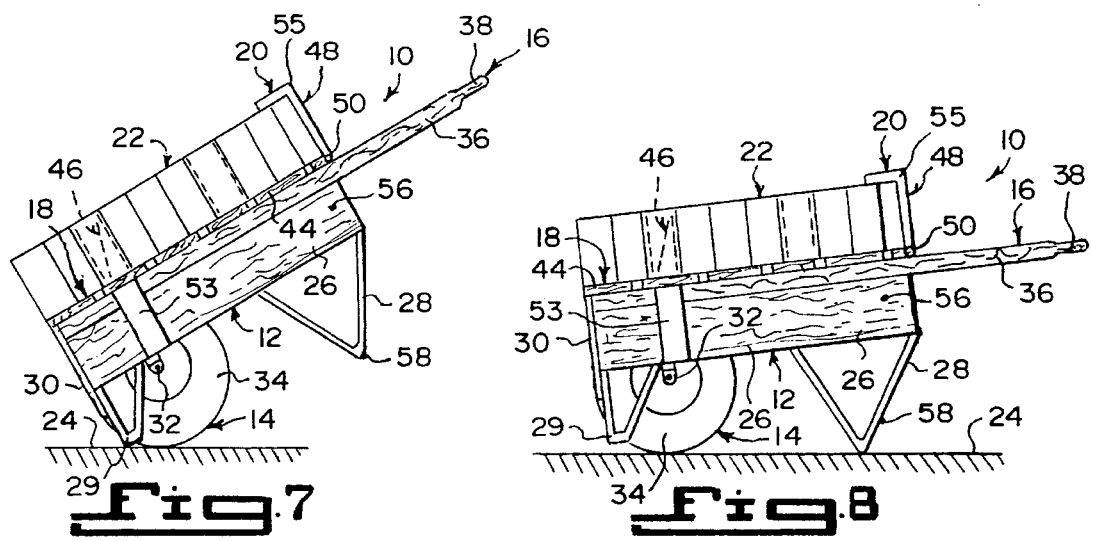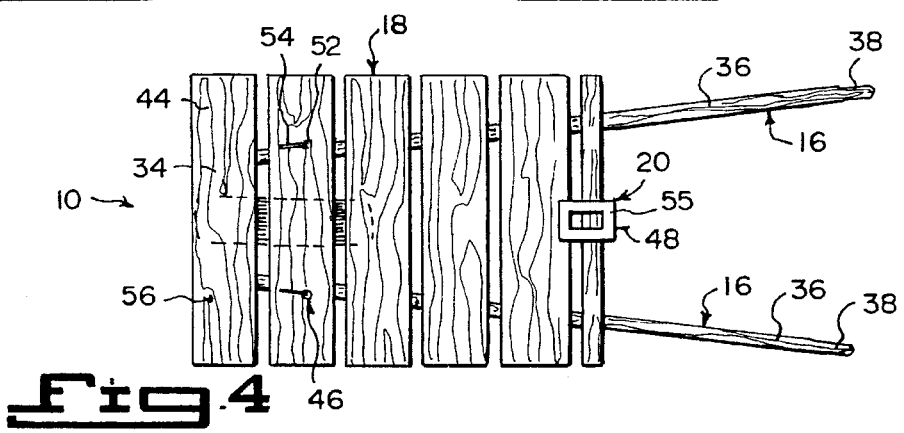

WHEELBARROW

BACKGROUND OF THE INVENTION

1. Field of the Invention

The instant invention relates generally to load carrying devices and more specifically it relates to an improved wheelbarrow.

2. Description of the Prior Art

Numerous load carrying devices have been provided in prior art. For example, U.S. Pat. Nos. 3,735,831 to Gray; 4,471,996 to Primeau; 4,758,010 to Christie; 4,921,305 to Steer and 5,048,206 to Jones all are illustrative of such prior art. While these units may be suitable for the particular purpose to which they address, they would not be as suitable for the purposes of the present invention as heretofore described.

GRAY, GARY W.

ARTICLE TRANSPORTING DEVICE

U.S. Pat. No. 3,735,831

Apparatus for transporting articles, such as bundles of bricks, including a supporting frame journalled on axles carried between a pair of wheels. A substantially vertical member is pivotally carried by the supporting frame and has a fork member carried thereby for engaging the articles to be transported. The vertical member has holes therein, through which bolts secure the fork member thereto, in a manner so that the fork member can be rotated slightly for properly positioning the fork so the articles can be transported. The vertical member can also be pivoted to properly locate the articles relative to the fork. The apparatus is powered by a gasoline operated motor.

PRIMEAU, MARIO

WHEELBARROW WITH PIVOTED HANDLES

U.S. No. Pat. No. 4,471,996

A load-carrying device comprises a frame adapted to support a load to be carried and having front and rear end portions. A wheel is rotatably mounted to the frame and positioned at the front end portion for supporting same. The device of the invention further comprises elongated handle means pivotally connected to the rear end portion and frame support means connected to and displaceable with the handle means. The handle means being pivotally movable between a first position whereat the handle means extends rearwardly of the frame for carrying the load with the frame support means being disposed to support the rear end portion, and a second position whereat the frame support means is retracted from its supporting portion. A releasable locking means is also provided for interlocking the handle means with the frame in the first position. Pivotal movement of the handle means from the first to the second position causes the frame to be displaced from a raised position above ground to a lowered position adjacent the ground and the rear end portion of the frame to be disposed substantially on ground level, thereby enabling the load to be loaded or unloaded at ground level.

CHRISTIE, HOWARD C.

CONVERTIBLE WHEELBARROW

U.S. No. Pat. No. 4,758,010

A convertible wheelbarrow, which is an improvement of the garden type wheelbarrow, having a tray with connectors for quickly removing it from the frame which has a load carrying area behind, above and forward of the wheel.

STEER, CLIVE A.

WHEELBARROW

U.S. No. Pat. No. 4,921,305

In a wheelbarrow having a bin for the load, a ground wheel at a front end of the bin and a handle at a rear end. The handle has a cam shaped extension which forms a leg for the bin rear end and which is mounted on a pivot carried on the bin. The handle can be released from its normal position and then pivoted forward in the direction of the wheel. This action causes rotation of the cam and the bin rear end is lowered to near ground level to allow easy loading of the bin. When loaded the handle can be returned to its position at the bin rear end and the cam simultaneously lifts the bin and load. The load may then be carried and emptied as with a conventional wheelbarrow.

JONES, WARREN S.

COMBINED SNOW SHOVELING DEVICE AND CART

U.S. No. Pat. No. 5,048,206

A combined snow shoveling device and cart for removing snow from surfaces in one mode of operation and for hauling debris in another mode of operation includes a scoop arranged with a reinforced front edge for scooping snow or other material from a surface and temporarily holding the collected material. A support frame is arranged with a handle portion and four wheels which are designed for movement across a surface. A first linkage member is attached to the scoop and to the support frame such that as the support frame is pushed across the surface by means of the four wheels resulting in movement of the scoop across that surface. A second linkage member is attached to the first linkage member and to the scoop and is arranged in order to change the orientation of the scoop such that any collected debris or snow can be elevated and moved to a remote site and then the orientation changed again into a dumping mode, so as to empty the scoop of any collected material.

SUMMARY OF THE INVENTION

A primary object of the present invention is to provide an improved wheelbarrow that will overcome the shortcomings of the prior art devices.

Another object is to provide an improved wheelbarrow that will allow one person to load, lift and haul one band of bricks as a unit from an unloading site to a building site to save time and labor.

An additional object is to provide an improved wheelbarrow that contains a pair of forklifts and a pivotally mounted brick holder on a flat bed, so as to engage with and lift the band of bricks, so that the band of bricks can be transported on the flat bed.

A further object is to provide an improved wheelbarrow that is simple and easy to use.

A still further object is to provide an improved wheelbarrow that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention.

FIG. 2 is a front view taken in the direction arrow 2 in FIG. 1.

FIG. 3 is a side view taken in the direction of arrow 3 in FIG. 2.

FIG. 4 is a top view taken in the direction of arrow 4 in FIG. 3.

FIGS. 5 through 8 are side views of the instant invention showing various steps taken to load, lift and haul one band of bricks.

DETAILED DESCRIPTION OF THE PREFERRED EMBODIMENTS

Turning now descriptively to the drawings, in which similar reference characters denote similar elements throughout the several views, FIGS. 1 through 8 illustrate an improved wheelbarrow 10, which consists of a framework assembly 12. A wheel assembly 14 is under a front lower end of the framework 12. A handle array 16 extends from a rear end of the framework 12. A flat bed 18 is on the handle array 16, over the framework 12 and the wheel assembly 14. A structure 20 on the flat bed 18 is for engaging with and lifting a band of bricks 22 onto the flat bed 18, so that the band of bricks 22 can be hauled as one unit from an unloading site 24 to a building site.

The framework 12 includes a pair of spaced apart forwardly converging side beams 26, carrying the wheel assembly 14 adjacent and under front ends of the side beams 26. a pair of leg supports 28 are provided, with each extending downwardly from a lower edge and adjacent a rear end of one side beam 26. A pair of load stabilizers 29 are also provided, with each extending downwardly from the lower edge and adjacent the front end of one side beam 26. A stabilizer brace 30 extends between the front ends of the load stabilizers 29.

The wheel assembly 14 consists of an axle bracket 32 mounted transversely on lower edges and adjacent to the front ends of the side beams 26. A wheel 34 is rotatively carried in the axle bracket 32.

The handle array 16 contains a pair of spaced apart forwardly converging elongated handles 36 mounted onto upper edges of the side beams 26 and extending away from the rear ends of the side beams 26. A pair of hand grips 38 are provided, with each integral with a distal free end of each elongated handle 36.

The flat bed 18 is a plurality of cross slats 44 mounted transversely across the elongated handles 36 between the front ends and the rear ends of the side beams 26.

The engaging and lifting structure 20 consists of a pair of spaced apart forklifts 46. Each extends through one cross slat 44 next to the front cross slat 44 and is mounted against a side of one side beam 26 for added strength. The forklifts 46 can be maneuvered to engage with one band of bricks 22, when a plurality of the band of bricks 22 are vertically stacked in a group together at the unloading site 24.

The engaging and lifting structure 20 further contains a brick holder 48, that is pivotally mounted by a hinge 50 along the rear cross slat 44. The brick holder 48 can clamp onto the band of bricks 22, to allow the framework 12 to tilt backwards with the band of bricks 22.

Each forklift 46 contains a channel member 52 extending perpendicular through the cross slat 44 next to the front cross slat 44. A plate 53 has a triangular shaped portion 54 mounted within the channel member 52 and extends downward against the side of one side beam 26 to be attached thereto. The brick holder 48 is an inverted L-shaped bar frame 55, to slip over the band of bricks 22.

The side beams 26, the elongated handles 36, the hand grips 38 and the cross slats 44 are all made out of wood material 56. The leg supports 28, the load stabilizers 29, the stabilizer brace 30, the forklifts 46 and the brick holder 48 are all made out of metal material 58.

LIST OF REFERENCE NUMBERS 10 improved wheelbarrow
12 framework
14 wheel assembly under 12
16 handle array on 12
18 flat bed on 16
20 engaging and lifting structure on 18
22 band of bricks
24 unloading site
26 side beam of 12
28 leg support of 12
29 load stabilizer of 12
30 stabilizer brace of 12
32 axle bracket of 14
34 wheel of 14
36 elongated handle of 16
38 hand grip of 16
44 cross slat of 18
46 forklift of 20
48 brick holder of 20
50 hinge between 44 and 48
52 channel member of 46
53 plate of 46
54 triangular shaped portion of 53
55 inverted L-shaped bar frame for 48
56 wood material for 26, 36, 38 and 44
58 metal material for 28, 29, 30, 46 and 48

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved wheelbarrow which comprises:

a) a framework, said framework including a pair of spaced apart forwardly converging side beams carrying said wheel assembly adjacent and under front ends of said side beams, a pair of leg supports, each extending downwardly from a lower edge and adjacent a rear end of one said side beam, a pair of load stabilizer, each extending downwardly from the lower edge and adjacent the front end of one said side beam, and a stabilizer brace extending between the front ends of said load stabilizers;

b) a wheel assembly under a front lower end of said framework, said wheel assembly including an axle bracket mounted transversely on lower edges and adjacent to the front ends of said side beams, and a wheel rotatively carried in said axle bracket;

c) a handle array extending from a rear end of said framework, said handle array including a pair of spaced apart forwardly converging elongated handles mounted onto upper edges of said side beams and extending away from the rear ends of said side beams, and a pair of hand grips, each integral with a distal free end of each said elongated handle;

d) a flat bed on said handle array over said framework and said wheel assembly, said flat bed including a plurality of cross slats mounted transversely across said elongated handles, between the front ends and the rear ends of said side beams; and e) means on said flat bed, for engaging with and lifting a band of bricks onto said flat bed, so that the band of bricks can be hauled as one unit from an unloading site to a building site, said engaging and lifting means including a pair of spaced apart forklifts, each extending through one said cross slat next to said front cross slat and mounted against a side of one said side beam for added strength, whereby said forklifts can be maneuvered to engage with one band of bricks when a plurality o the band of bricks are vertically stacked in a group together at the unloading site, said engaging and lifting means further including a brick holder pivotally mounted along said rearward cross slat, so that said brick holder can clamp onto the band of bricks to allow said framework to tilt backwards with the band of bricks.

2. An improved wheelbarrow as recited in claim 1, wherein each said forklift includes:

a) a channel member extending perpendicular through said cross slat next to said front cross slat; and b) a plate having a triangular shaped portion affixed within said channel member and extending downwardly against the side of one said side beam to be attached thereto.

3. An improved wheelbarrow as recited in claim 2, wherein said brick holder is an inverted L-shaped bar frame to slip over the band of bricks.

4. An improved wheelbarrow as recited in claim 2, wherein said side beams, said elongated handles, said hand grips and said cross slates are all made out of wood material.

5. An improved wheelbarrow as recited in claim 4, wherein said leg supports, said load stabilizers, said stabilizer brace, said forklifts and said brick holder are all made out of metal material.

\* \* \* \* \*